(No Model.) 2 Sheets—Sheet 1.
H. M. IRWIN.
SAWING MACHINE.
No. 288,440. Patented Nov. 13, 1883.
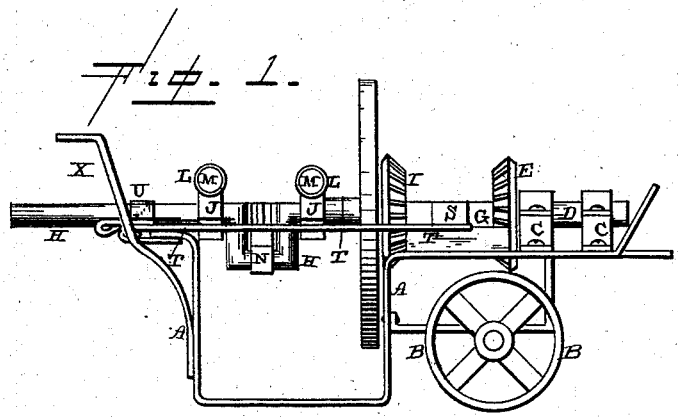
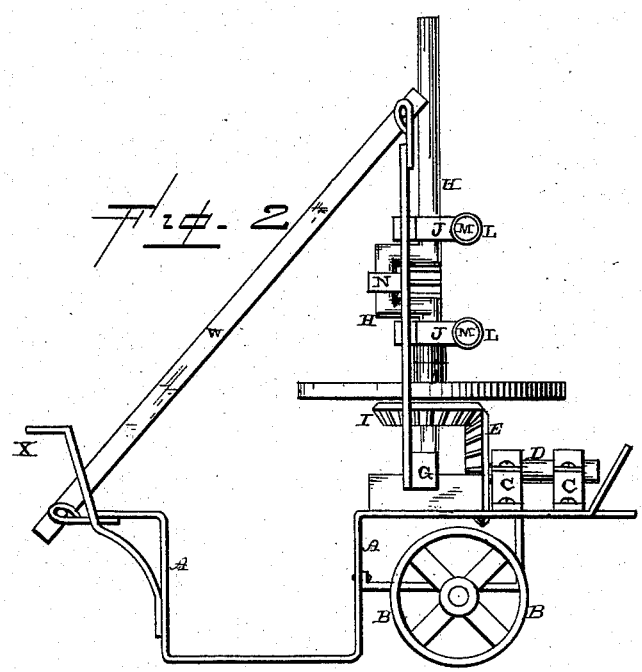
Witnesses.
Louis F. Gardner
J. W. Garner
Inventor.
H. M. Irwin,
per
J. A. Lehmann,
atty.
N. PETERS. Photo-Lithographer, Washington, D. C.

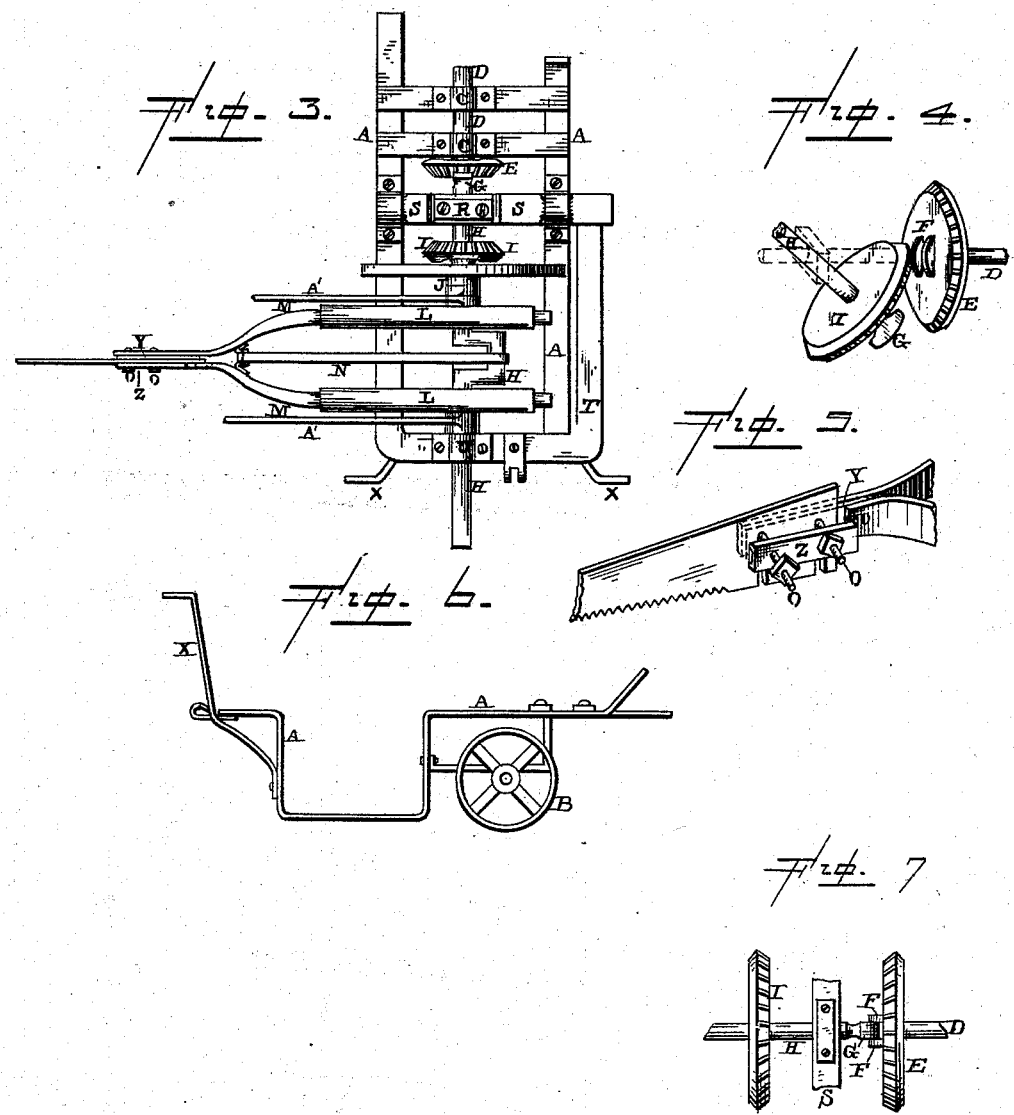

UNITED STATES PATENT OFFICE.

HALL M. IRWIN, OF TYLER, TEXAS.

SAWING-MACHINE.

SPECIFICATION forming part of Letters Patent No. 288,440, dated November 13, 1883.

Application filed March 21, 1883. (No model.)

*To all whom it may concern:*

Be it known that I, HALL M. IRWIN, of Tyler, in the county of Smith and State of Texas, have invented certain new and useful Improvements in Sawing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in sawing-machines; and it consists, first, in a frame carrying the driving-shaft and the saw, and which can be used in either a horizontal or a vertical position, according as to whether the tree is to be sawed down or the tree lying upon the ground is to be cut into logs; second, in the combination of a driving-shaft having a beveled gear placed upon one end, and provided with a socket at its center, with the crank-shaft, which is journaled in a pivoted frame, and which crank-shaft is provided with a suitably-shaped end to catch in the socket in the wheel, and a beveled-gear wheel, whereby the saw may be run in either a vertical or a horizontal position; third, in a saw having two or more recesses in one of its edges at its inner end, which recesses pass over the clamping-bolts, which pass through the parts between which the saw is held by frictional contact, whereby the saw can be loosened from the machine and made to cut on either side of a standing tree or taken out of either a vertical or horizontal cut, which has had wedges driven in, to prevent the wood from biting the saw by loosening the bolts enough to unclamp it, and thus allow it to be removed without moving the machine, as will be more fully described hereinafter.

The object of my invention is to produce a sawing-machine which can be used for first sawing the trees down, and then dividing the trunks into logs or lengths as they lie upon the ground.

Figure 1 is a side elevation of a machine embodying my invention. Fig. 2 is a similar view of the same, showing the crank-shaft raised. Fig. 3 is a plan view. Fig. 4 is a detail view of the wheel on the main driving-shaft and the end of the crank-shaft. Fig. 5 is a detail view. Fig. 6 is a side elevation of the frame alone. Fig. 7 is an enlarged detail view, showing the connection between the two shafts when in a line with each other.

A represents the main frame, which may be made from a single piece of metal, which is bent into the form shown, or any other that may be preferred. As here shown, this frame is bent downward at one end, so as to form solid bearings or supports, and is provided with the handles X, while the other end is supported by means of the wheels B. In suitable bearings, C, which are formed upon one end of the frame, is journaled the main driving-shaft D, which has the beveled-gear wheel E secured to its end. This gear-wheel has the socket F formed at its center, into which the end G of the crank-shaft H catches when the two shafts are in a line with each other. When the crank-shaft H, which is provided with a balance-wheel, is turned in a vertical position, its end is moved out of the socket in the wheel, so that the beveled gear I, which is secured to the crank-shaft, will be made to engage with the beveled gear upon the driving-shaft. In order that the end of the crank-shaft can enter and leave the socket formed in the end of the beveled wheel of the driving-shaft, the wheel must always be turned so that the socket will stand in a vertical position, and then the end of the crank-shaft will leave it as it is raised into a vertical position, and re-enter as the shaft is turned back into a horizontal position. The beveled wheel I upon the crank-shaft only engages with the beveled wheel of the driving-shaft when the saw is turned into position to saw the tree down. When the crank-shaft is in a horizontal position, the saw is to be used for dividing the trunks of the trees which have been sawed down into logs, and then the crank-shaft is driven wholly by the socket in the beveled wheel.

Secured to the crank-shaft, on each side of the crank, are suitable bearings or blocks, J, upon which are secured the tubular guides L. These guides are held rigidly in position, and have no movement except to allow the saw to be raised or lowered while at work upon logs lying upon the ground, or to be turned up with the frame, as shown in Fig. 2, while the saw is cutting down the tree. Through these guides are passed the rods M, which have their outer ends bent so as to be connected together, and which serve as a means for attachment of the saw. Fastened to the crank itself is the connecting-rod N, which has its outer end secured to the guiding-rods, so that as the crank is made to revolve the rods are forced back and forth through the guides, and thus impart a reciprocating movement of the saw. In order that the saw may be readily attached to and removed from the guiding-rods, a suitable plate, Y, is fastened at one end between the rods, and has two clamping-bolts, O, passed through it. The end of the saw has suitable catches or recesses cut in it, so as to pass over the tops of the bolts, (screws,) and is then clamped in position by means of a short plate, Z, which is placed against the saw inside of the clamping-nuts, and which has its two edges slightly turned over toward the saw. When the nuts are turned so as to bind tightly against the piece Z, the saw is clamped securely in position.

In order that the crank-shaft may be raised from a horizontal to a vertical position, so as to adapt the saw to cut down standing trees, it is journaled at its inner end in the box R, which is secured upon the top of a cross-axle, S, placed upon the inner end of the frame A. This axle is placed in suitable boxes, and the bearing R can be turned one-quarter around. To one end of this axle is secured the frame T, which has the box U secured upon one end, and which frame rests upon the top of the frame A when the saw is in position to make a vertical cut. When the saw is to be turned into a horizontal position, the crank-shaft, carrying this frame with it, is raised into a vertical position, as shown in Fig. 2. In order to brace this frame rigidly in position while the saw is being used in cutting down standing trees, the brace W is used. The stationary frame A and the pivoted frame have each a means for attachment of this brace, so that while the saw is being operated in a horizontal position the frame will be held rigidly in place. Upon the crank-shaft, upon both sides of the crank, will be fastened suitable blocks, in which dogs A' will have their inner ends fastened, and which dogs will have their outer ends forced into the logs or trees which are being sawed.

By means of a machine constructed as above described it will be seen that trees can first be cut down and then divided into logs as they lie upon the ground.

Having thus described my invention, I claim—

1. In a sawing-machine, the combination of a driving-shaft provided with a wheel upon one end, and which wheel has a socket formed in its inner end, with a crank-shaft having its end so shaped as to catch in the socket in the wheel, and provided with a bevel-gear which meshes with the bevel-wheel upon the driving-shaft when the crank-shaft is turned into a vertical position, substantially as shown.

2. The combination of the driving-shaft, having a beveled gear provided with a socket on its inner end, with the crank-shaft having its end adapted to catch in the socket, and provided with a bevel-gear which meshes with the bevel-gear upon the driving-shaft when the crank-shaft is turned into a vertical position, and the pivoted frame in which the crank-shaft is journaled, substantially as described.

3. The combination of the main frame A, the pivoted frame attached thereto and carrying the crank-shaft, with the brace which holds the pivoted frame in position while the saw is being used for cutting down trees, substantially as specified.

In testimony whereof I affix my signature in presence of two witnesses.

HALL M. IRWIN.

Witnesses:
S. C. HALVERSON,
GEO. PANBRON.